Patented June 13, 1939

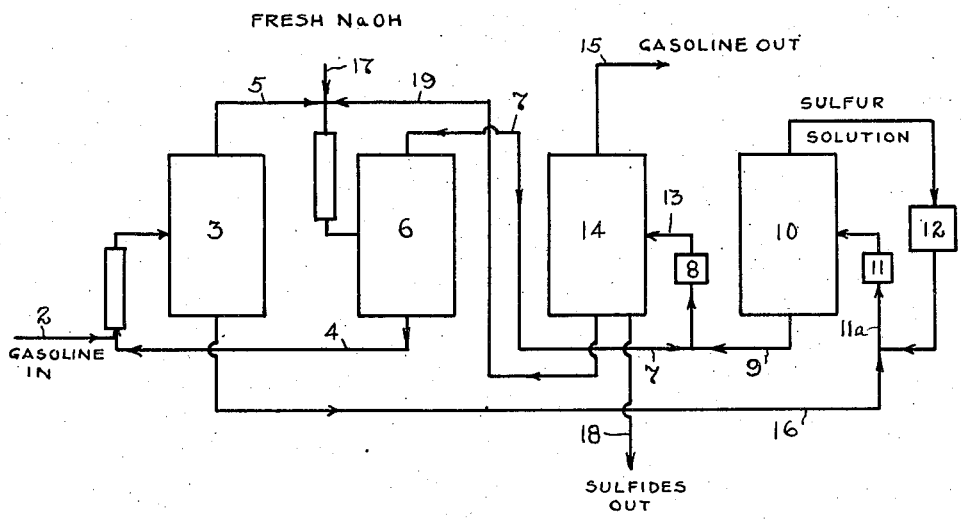

2,162,670

UNITED STATES PATENT OFFICE 2,162,670

REMOVING SULPHUR COMPOUNDS AND SWEETENING HYDROCARBON LIQUIDS

Robert E. Burk and Everett C. Hughes, Cleveland, Ohio, assignors to The Standard Oil Company (Ohio), Cleveland, Ohio, a corporation of Ohio Application November 25, 1936, Serial No. 112,732

3 Claims. (Cl. 196—30)

This invention relates to treatment of hydrocarbon distillates; and it is among the objects of the invention to provide a treatment along the lines of certain modified reagent and catalytic conditions such as to attain excellent products, with economy and very desirable manufacturing procedure.

To the accomplishment of the foregoing and related ends, the invention, then, comprises the features hereinafter fully described, and particularly pointed out in the claims, the following description and the annexed drawing setting forth in detail certain illustrative embodiments of the invention, these being indicative however, of but a few of the various ways in which the principle of the invention may be employed.

In said annexed drawing:

The sole figure is a semi-diagrammatic showing of apparatus contemplated in accordance with the invention.

A hydrocarbon liquid which is to be treated for sulphur content is brought into admixture with an aqueous caustic alkali solution, being thoroughly mixed and then separated. Advantageously, this may be repeated successively two or more times, and it is desirable that the mixing and general flow of the liquids occur countercurrently. For instance, the hydrocarbon liquid, as a gasoline, may be forwarded through the line 2 into a mixing chamber 3, where it mixes with and is treated by a caustic soda solution forwarded through line 4. The hydrocarbon liquid, separating, is passed by the line 5 to another treating chamber 6, where it may again be admixed with oncoming caustic soda solution, and after separation, it is forwarded by line 7 to the chamber 8 where it encounters and is admixed with aqueous caustic soda solution introduced by line 9 from chamber 10 and the regenerating portion of the system. It will be understood that where aqueous caustic alkali solution is employed in treatment of hydrocarbon liquids, such as mercaptan-containing distillates, the caustic alkali solution becomes loaded up with alkali metal mercaptides to such extent that it would be without further utility, unless re-generated, and in the present system this is taken care of in that portion comprising the chamber 10 and associated chambers 11 and 12. A cycle of aqueous caustic alkali solution is thus made possible, the solution circulating around into contact with the distillate to be treated, and then at an appropriate juncture being re-generated, and returned to operate with oncoming distillate. In accordance with the invention particularly, the re-generated caustic alkali solution as coming from the chamber 10 to meet the hydrocarbon liquid, encounters the latter in admixture at the chamber 8, the hydrocarbon liquid being forwarded by connection line 7 and the aqueous caustic alkali solution being forwarded by the connection line 9. In the chamber 8 the admixture and action goes on in the presence of a catalytic agent, then the mixture of hydrocarbon liquid and aqueous alkali solution is passed by connection line 13 to the settling chamber 14, from whence the hydrocarbon liquid having completed its excursion through the treating chambers 3, 6, 14, proceeds by outlet line 15 from the system, in finished condition so far as sulphur treatment is concerned, and ready for a final water wash if desired, or other usage. The catalyst in the catalytic mixing chamber 8 is a divalent metal agent, and may be copper sulphide, or less desirably metallic lead, a divalent metal sulphide, as lead sulphide, or a divalent metal silicate, as lead silicate, copper silicate, etc. We may provide metallic lead in suitably extended surface exposure and in convenient form, as plates, liners, irregular fragments, shot in baskets or holders, or instead of all-lead pieces, lead-surfaced steel in convenient form may be employed, the lead surfacing being the desideratum, this taking up a coating of lead sulphide before or in operation. In employing a suphide, as copper sulphide, this may be in a form to more or less suspend in the liquid during its churning stage in the chamber 8, there being a sufficient settling anterior to the discharge point of the liquid to prevent the catalyst being carried away from the chamber. With particular advantage however, the copper sulphide, or galena, or lead sulphide compressed into pellets may be applied as a sort of tower-packing, or lead sulphide may be mixed with molten lead and the product be broken up or formed into shapes or packing. Likewise, copper silicate, lead silicate, as indicated. Where desired, the catalyst may be shaped into or coated on Raschig rings or the like as an advantageous contact surface providing arrangement. As indicated, the action in the catalytic chamber 8 involves the hydrocarbon liquid or distillate after it has been contacted with one or more stages of caustic alkali solution treatment, and in the catalytic stage here concerned, the caustic alkali solution is peculiar in that it contains material incorporated by having been in contact with elemental sulphur to allow reaction, the elemental sulphur being circulated in a cycle through chambers 12, 11 and 10. The carrier for the elemental sulphur may be a suitable liquid, such as naphtha, solvent naphtha, or other convenient hydrocarbon or solvent capable of carrying free sulphur. In contacting the free sulphur with the spent caustic alkali solution as received through connection line 16 from its last stage of operation against the oncoming hydrocarbon liquid or distillate, a catalyst again may be provided, the reaction of the organic solution of elemental sulphur and the aqueous alkali solution which is spent or loaded with alkali mercaptides being greatly facilitated by the catalytic action of the agent therefor, such as in chamber 11, and the detail of the catalysts here may be as described foregoing for the catalytic chamber 8. The sulphur which is put into the caustic alkali solution in mixing line 11a is such as to be substantially all used up in reaction where relatively acidic mercaptans are involved, the catalyst acting to accelerate the conversion of such mercaptans, the sulphur being then all taken up, the aqueous alkali solution proceeds to the chamber 8 where it reacts with less acidic mercaptans and on to the treating chamber 6 etc., where as alkali hydroxide it reacts with and removes the more acidic mercaptans. In this manner, hydrocarbon liquids or distillates containing both types of mercaptans are progressively treated to complemental removal of both, the more acidic mercaptans in the caustic alkali treating stages 6, 3, etc., and the relatively non-acidic mercaptans in the treating stages 8 etc., the sulphur contacting stage just prior thereto having been of proportion to furnish enough sulphur to convert all alkali mercaptides in the caustic alkali solution to disulphides plus enough to form sodium polysulphides sufficient for the next succeeding reaction. In this manner, sulphur taken over into the hydrocarbon bath is present as sodium polysulphides. The aqueous alkali solution loading up with sodium sulphide compounds to the point of separation of the latter, elemination of waste product surplus thereof from the system takes place at a convenient location, as for instance where settled out at the bottom of tower chamber 14.

It is thus possible to operate the system with close control of the sulphur such as to eliminate in the waste product stage sulphides of sodium with loss of a minimum of sulphur. Fresh caustic alkali in replenishment of the system is supplied at a convenient point, as for instance by line 17 to treating chamber 6. The make-up caustic may be of convenient strength, as for instance 20 to 50° Bé., and the actual strength of caustic in the system can be maintained at any desired level when thus operated. Solid alkali sulphides or waste sulphides eliminating from the system may be taken off through connection 18, and with filtering, cetrifuging, thickener apparatus as well known in the chemical industry, or the like.

As an example: A gasoline is fed into counter-current admixture with caustic soda solution of approximately 15° Bé., being passed counter-currently, the caustic soda solution as leaving the incoming stage of the gasoline being passed then to contact with a naphtha solution of free sulphur, for regeneration, in the presence of galena, and on being separated from the naphtha solution of sulphur being brought into contact with and thoroughly admixed with the gasoline near its final treatment, again there being present galena as catalyst. The gasoline thence passes from the system, and the caustic soda solution proceeds on counter-currently against the oncoming gasoline. A gasoline of .017 per cent mercaptan sulphur is reduced in the first two stages to .0028 per cent mercaptan sulphur and in the last stage to nearly doctor sweet, i. e. .0013 per cent mercaptan sulphur or less.

Other modes of applying the principle of the invention may be employed, change being made as regards the details described, provided the features stated in any of the following claims, or the equivalent of such, be employed.

We therefore particularly point out and distinctly claim as our invention:

1. In a process of removing sulphur compounds and sweetening hydrocarbon distillates, comprising, circulating a aqueous caustic soda solution in a closed circuit, and at one portion of such circuit washing with the aqueous solution a light hydrocarbon distillate from which mercaptans are to be removed countercurrently in a plurality of stages, and simultaneously in said circuit contacting the mixture with lead catalytic surfaces, separating the light hydrocarbon distillate from the aqueous solution, circulating an organic solution of elemental sulphur in a closed circuit, contacting such solution of sulphur in a portion of its circuit with the circuit of the aqueous caustic soda solution after its separation from the hydrocarbon distillate, and simultaneously contacting the organic solution of sulphur and the aqueous caustic soda solution with lead catalytic surfaces and separating the aqueous caustic soda solution to further travel in its circuit.

2. In the process of removing sulphur compounds and sweetening hydrocarbon distillates, comprising circulating an aqueous caustic soda solution in a closed circuit, and at one portion of such circuit washing with the aqueous solution a light hydrocarbon distillate from which mercaptans are to be removed countercurrently in a plurality of stages, and simultaneously in said circuit contacting the mixture with copper sulphide catalytic surfaces, separating the light hydrocarbon distillate from the aqueous solution, circulating an organic solution of elemental sulphur in a closed circuit, contacting such solution of sulphur in a portion of its circuit with the circuit of the aqueous caustic soda solution after its separation from the hydrocarbon distillate and simultaneously contacting the organic solution of sulphur and the aqueous caustic soda solution with copper sulphide catalytic surfaces and separating the aqueous caustic soda solution to further travel in its circuit.

3. In the process of removing sulphur compounds and sweetening hydrocarbon distillates, comprising circulating an aqueous caustic soda solution in a closed circuit, and at one portion of such circuit washing with the aqueous solution a light hydrocarbon distillate from which mercaptans are to be removed countercurrently in a plurality of stages, and simultaneously in said circuit contacting the mixture with surfaces of catalytic sulphide formers of the group consisting of lead and copper, separating the light hydrocarbon distillate from the aqueous solution, circulating an organic solution of elemental sulphur in a closed circuit, contacting such solution of sulphur in a portion of its circuit with the circuit of the aqueous caustic soda solution after its separation from the hydrocarbon distillate and simultaneously contacting the organic solution of sulphur and the aqueous caustic soda solution with surfaces of catalytic metallic sulphide formers of the group consisting of lead and copper and separating the aqueous caustic soda solution to further travel in its circuit.

ROBERT E. BURK.
EVERETT C. HUGHES.